United States Patent [19]

Rosenstein

[11] 4,079,466
[45] Mar. 21, 1978

[54] SYNTHETIC RESINOUS GARMENT

[76] Inventor: William Rosenstein, 1270 Broadway, New York, N.Y. 10001

[21] Appl. No.: 752,078

[22] Filed: Dec. 20, 1976

[51] Int. Cl.² .............................................. A41D 3/04
[52] U.S. Cl. ............................................. 2/87; 56/290
[58] Field of Search ........................ 2/87, 269, 88, 84; 156/73; 428/200; 229/48 T

[56] References Cited

U.S. PATENT DOCUMENTS

| 2,547,097 | 4/1951 | Schjeldahl et al. | 229/48 T UX |
| 2,773,285 | 12/1956 | Piazze et al. | 156/290 |
| 3,665,518 | 5/1972 | Leadford | 2/88 |
| 3,881,041 | 4/1975 | Glienke | 2/269 |

FOREIGN PATENT DOCUMENTS

| 43,706 | 1/1931 | Denmark | 2/84 |

Primary Examiner—Doris L. Troutman
Attorney, Agent, or Firm—Charles E. Temko

[57] ABSTRACT

A synthetic resinous garment or similar article, the vertical length and sleeve length of which are adjustable by cutting along predetermined parallel lines formed by heat sealing welds positioned parallel to the lower edges of the body enclosing tubular element of the garment, and the corresponding lower edges of the sleeves.

2 Claims, 3 Drawing Figures

SYNTHETIC RESINOUS GARMENT

BACKGROUND OF THE INVENTION

This invention relates generally to the field of clothing, and more particularly to an improved raincoat formed substantially entirely of synthetic resinous materials, and having provision incorporated during the manufacture thereof for the adjustment of the length of the sleeves and the length of the body enclosing panels to suit an individual wearer.

Clothing manufactured from textile materials possessing similar characteristics are known in the art. The U.S. patent to Goodman, U.S. Pat. No. 2,534,551 of Dec. 19, 1950, for example, discloses a coat sleeve construction in which an additional length of material is folded inwardly of the edges of the sleeve to be concealed from view by stitch means until the additional length is required. Another construction is illustrated in the U.S. patent to Bisberg, U.S. Pat. No. 2,227,214 of Dec. 31, 1940, which relates to a lady's slip, the lower edge of which is provided with a plurality of textile strips interconnected to each other, or to the lower edge of the garment by a zig-zag stitch, which stitch is easily cut or otherwise removed. The Meisel U.S. Pat. No. 2,669,726 of Feb. 23, 1954 discloses a waist or leg band having a plurality of knitted lines forming a plurality of several members, such that with the removal of interconnecting stitches, the remaining band will have a closed selvage. The teachings taught by this patent require thread type stitching, and, as a consequence, they are not suitable for use in garments made of synthetic resinous materials in which the component parts are interconnected by heat sealing operations.

SUMMARY OF THE INVENTION

Briefly stated, the invention contemplates the provision of a synthetic resinous garment, such as a raincoat, in which the body of the garment is formed by interconnecting thicknesses of such material to form panels, and interconnecting the panels to form the garment by heat sealing welds. The panels forming the lower edges of the sleeves and lower edges of the main body portions of the garment are interconnected by a plurality of parallel welds at spaced intervals, to form the equivalent of a selvaged edge, whereby the length of a sleeve or main body portion of the garment may be shortened by cutting with a scissors along the lower edge of the welds.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
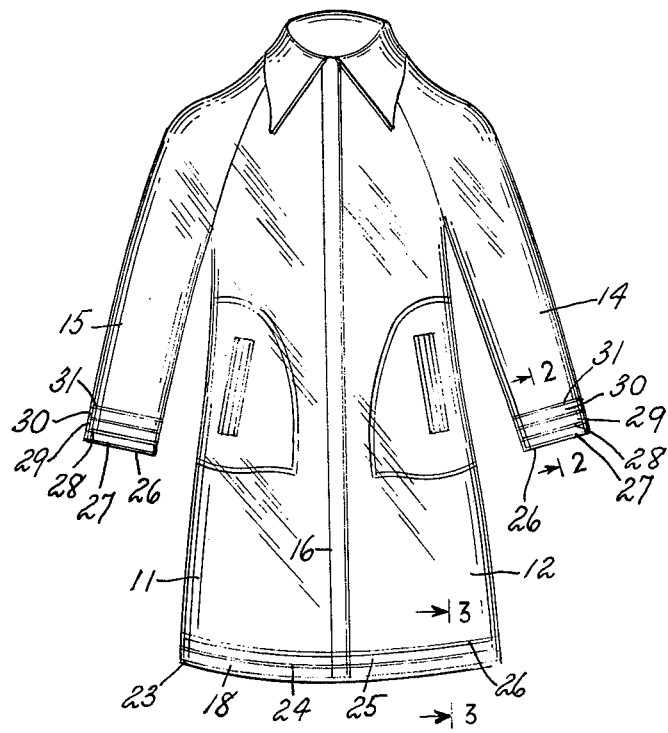
FIG. 1 is a front elevational view of a garment embodying the invention.

In accordance with the invention, the device, generally indicated by reference character 10 is illustrated in FIG. 1 in the form of a synthetic resinous raincoat. The device is constructed using known techniques and planar synthetic resinous material (not shown) which is cut to appropriate configuration and thermoplastically welded in lieu of stitching normally used in the case of textile materials. As seen in FIG. 1, the garment includes a tubular main body portion including a pair of front panels 11 and 12, a pair of rear panels (not shown), a left sleeve 14, and a right sleeve 15. The front panels 11 and 12, in closed condition, form an overlapping front edge 16, and are interconnected by buttons or snap fasteners (not shown).

Figure 2:
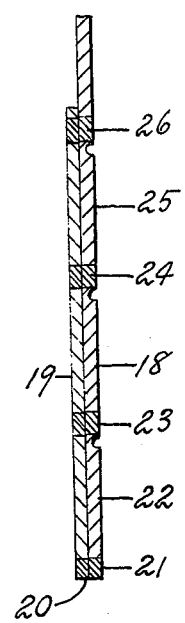
FIG. 2 is an enlarged fragmentary sectional view thereof as seen from the plane 2-2 in FIG. 1.

Referring to FIGS. 1 and 2, a lower edge 20 of the tubular main body is bounded by a first weld 21 of linear configuration. Separated from the first weld 21 by an unlaminated area 22 is a second weld 23 parallel to the first weld, and interconnecting plies of material 18 and 19. A third weld 24, unlaminated area 25, and fourth weld 26 are disposed thereabove.

The left and right sleeves 14 and 15 are formed in a similar fashion, a lower edge 26 being formed by a first weld. An unlaminated area 27 separates the first weld 26 from the second weld 28. A further unlaminated area 29 separates a third parallel weld 30, as does another unlaminated area 31 from a fourth weld 32. Normally, intervals of one inch to one and one half inches are suitable for adjusting the length of the main body tubular element of the garment, and intervals of one inch or less are preferable in the case of the sleeves 14–15.

Figure 3:
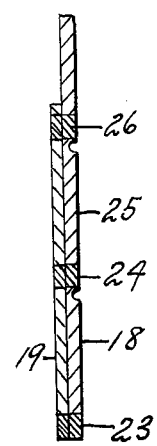
FIG. 3 is a fragmentary sectional view corresponding to that seen in FIG. 2, showing the embodiment after alteration.

As best seen in FIG. 3, the shortening operation consists of cutting along the desired weld at the lower edge thereof, that is to say the line at which the weld communicates with the next lower unlaminated area. Following this procedure will assure that the garment, when shortened, will be bounded by the equivalent of a selvaged edge of neat appearance.

I wish to be understood that I do not consider the invention limited to the precise details of structure shown and set forth in this specification, for obvious modifications will occur to those skilled in the art to which the invention pertains.

I claim:

1. A synthetic resinous garment having provision for adjustment of the effective length of the tubular elements thereof, said tubular elements having a lower free edge portion thereof formed by a plurality of plies of synthetic resinous material heat sealed together by linear welds; one of said welds being positioned at a lower free edge, there being at least a second linear weld in spaced parallel relation relative to said first mentioned weld interconnecting said plies of planar material; whereby the cutting of said tubular element along an edge of said second weld closest to said first weld will provide an effective shortening of the tubular element.

2. Structure in accordance with claim 1, further characterized in the provision of a third linear weld in spaced relation to said second weld to provide means for additional shortening of said tubular element.

* * * * *